United States Patent [19]

Dischert et al.

[11] Patent Number: 4,550,337

[45] Date of Patent: Oct. 29, 1985

[54] DIGITAL VIDEO TRANSMISSION SYSTEM

[75] Inventors: Robert A. Dischert, Burlington; Warren H. Moles, Flemington; Roland N. Rhodes, Belle Mead; James M. Walter, Columbus, all of N.J.

[73] Assignee: RCA Corporation, Princeton, N.J.

[21] Appl. No.: 482,821

[22] Filed: Apr. 7, 1983

[51] Int. Cl.⁴ .............................................. H04N 9/32
[52] U.S. Cl. ...................................... 358/13; 358/145
[58] Field of Search ...................... 358/17, 19, 13, 145

[56] References Cited

U.S. PATENT DOCUMENTS 3,755,624  8/1973  Sekimoto ............................ 358/145
3,795,763  3/1974  Golding et al. ...................... 358/13
4,119,999  10/1978  Gallo ................................... 358/17

Primary Examiner—Richard Murray
Attorney, Agent, or Firm—P. J. Rasmussen; P. M. Emanuel; R. G. Coalter

[57] ABSTRACT

A video signal is serially enclosed for transmission in PCM form during synchronizing level intervals and encoded in a run length limited NRZ form during non-synchronizing level intervals, each PCM word being selected from minimum and maximum disallowed states of the NRZ code. In a decoder, a first detector responds only to the presence of the PCM code for synchronizing a second detector with response to both the NRZ and PCM coded portions of the encoded video signal to provide a decoded video output signal whereby the PCM portion of the signal conveys both decoder timing information and information as to a specific level of the video signal.

18 Claims, 8 Drawing Figures

DIGITAL VIDEO TRANSMISSION SYSTEM

FIELD OF THE INVENTION

This invention relates to digital video transmission systems and particularly to systems in which transmission is in serial synchronous form.

BACKGROUND OF THE INVENTION

It is known to use coaxial cable to couple television source equipment (e.g., cameras, recorders, film scanners, etc.) to associated studio equipment (e.g., mixers, special effects generators, transmitters, etc.). Where the transmission link is relatively long (say, a few hundred feet) or is subject to relatively harsh environmental conditions, it would be advantageous to provide transmission via fiber optic cable. Such cables are rugged, relatively inexpensive and provide a very wide bandwidth transmission capability. In order to avoid certain nonlinearities inherent in optical emitters and detectors, it is desirable to employ digital encoding and decoding of the video signal.

Digital transmission requires precise synchronization of the receiver (decoder) with the transmitter (encoder). This problem becomes particularly troublesome where it is desired to transmit the video signal in serial form since the data rate for the encoded signal can easily exceed 100 MBS (mega-bits per second). At such data rates a synchronization error of only a few nanoseconds can make the difference between an error free transmission and one in which the signal is grossly distorted if not completely lost.

In one form of digital transmission system the signal is encoded in pulse code modulation (PCM) form and transmitted synchronously, with the decoder being synchronized by means of a framing code that is periodically inserted in the transmitted signal. The use of framing codes advantageously increases the transmission efficiency of the system as compared with so called "start-stop" asynchronous transmissions wherein each word includes a start bit and one or two stop bits to synchronize the receiving decommutator.

SUMMARY OF THE INVENTION

Heretofore, the framing code or synchronizing portion of serial synchronous digital transmission systems has required the use of relatively complex circuits both in the transmitter and in the receiver. The complexity resides in part in the need to precisely identify the start of each transmission, in part to the need to convey accurate clock timing information and in part to the need to separate the timing information from the recovered data information in the receiver.

It is an object of the present invention to provide a serial synchronous digital video transmission system in which each transmitted word conveys video information and in which certain transmitted words additionally convey decommutator control and timing information.

It is a further object of the invention to provide a serial synchronous digital video transmission system in which the encoded signal exhibits a substantially constant average value or "DC component".

In accordance with the invention, a video signal is serially encoded for transmission in PCM form during synchronizing level intervals and encoded in a run length limited NRZ form during non-synchronizing level intervals, each PCM word being selected from minimum and maximum disallowed states of the NRZ code. In a decoder, a first detector responds only to the presence of the PCM code for synchronizing a second detector which responds to both the NRZ and the PCM encoded portions of the encoded video signal to provide a decoded video output signal whereby the PCM portion of the signal conveys both decoder timing information and information as to a specific level of the video signal.

In accordance with another aspect of the invention, an encoder for providing serial synchronous digital transmission of a video input signal comprises an input means responsive to the video input signal for providing a color subcarrier reference signal, a synchronizing level identification signal and a run length limited NRZ encoded video output signal. A first circuit means responsive to the synchronizing level identification signal selectively couples the NRZ and PCM encoded signal to an output node to provide an encoded digital output signal.

In accordance with yet another aspect of the invention, a decoder includes an input means for receiving a bit-serial digital input signal manifestation comprising sequential binary words representative of an encoded video signal, each word which is representative of a synchronizing level condition of the video signal being encoded in PCM form, each word representative of a non-synchronizing level condition of the video signal being encoded in run length limited NRZ form, each PCM encoded word having a binary value different from that of each NRZ encoded word. A first means responsive to the PCM encoded portion of the signal manifestation provides first and second clock signal at the bit rate and word rate, respectively, of the digital signal manifestation. A second means responsive to the clock signals decodes both the PCM portion and the NRZ portion of the signal manifestation to provide a digital video output signal in which each word is in bit-parallel form.

BRIEF DESCRIPTION OF THE DRAWING

The invention is illustrated in the accompanying drawing wherein like elements are identified by like designators and in which:

FIGS. 6A–6C are diagrams of block codes processed by the decoder of FIG. 4.

DETAILED DESCRIPTION

Figure 1:
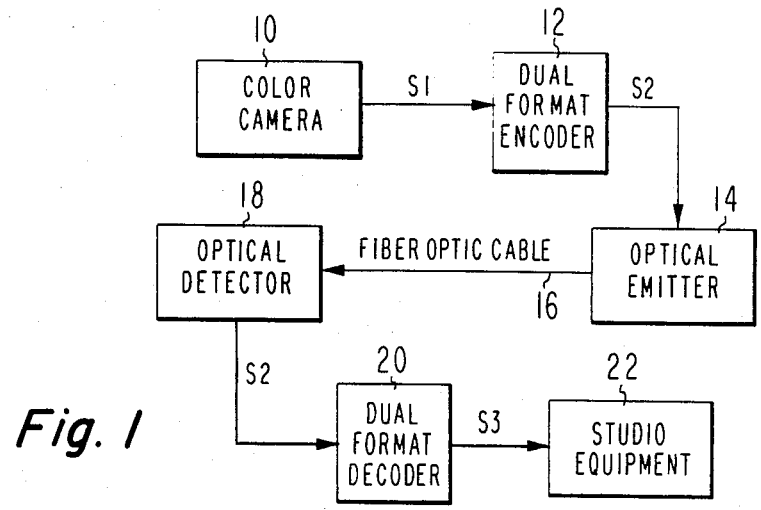
FIG. 1 is a block diagram of a serial synchronous digital video transmission system embodying the invention.

The system of FIG. 1 comprises a source 10 for providing a video signal S1 to be transmitted. Source 10 may comprise a color camera (as shown) or any other suitable video source equipment, and the signal S1 may be of composite or component (RGB) form and may be either an analog or a digital representation of the video signal. For purposes of illustration, it will hereafter be assumed that the signal S1 is an analog representation of a composite color television signal and includes a color subcarrier reference signal component.

Video signal S1 is applied to the input of a "dual format" encoder 12 which produces a serial synchronous digitally encoded output signal S2. The two transmission formats provided by encoder 12 are PCM (pulse code modulation) wherein each bit is representated by a predetermined level of signal S2 and NRZ (non-return to zero) wherein bits are represented by transitions or non-transitions of signal S2. Transmission is via PCM during synchronizing level conditions of signal S1 and via NRZ otherwise.

The PCM and NRZ codes are specially selected to facilitate subsequent decoding in accordance with the following criteria. First, the NRZ code is run length limited at both extremes of its range of values. Specifically, signal S1 is processing in such a manner that the NRZ portion of signal S2 is represented by code words having a minimum binary value greater than zero and a maximum binary value less than "all ones". The second criterion is that the PCM encoded words are sent in blocks comprised of words representative of the "excluded" or "disallowed" NRZ code values.

Figure 3:
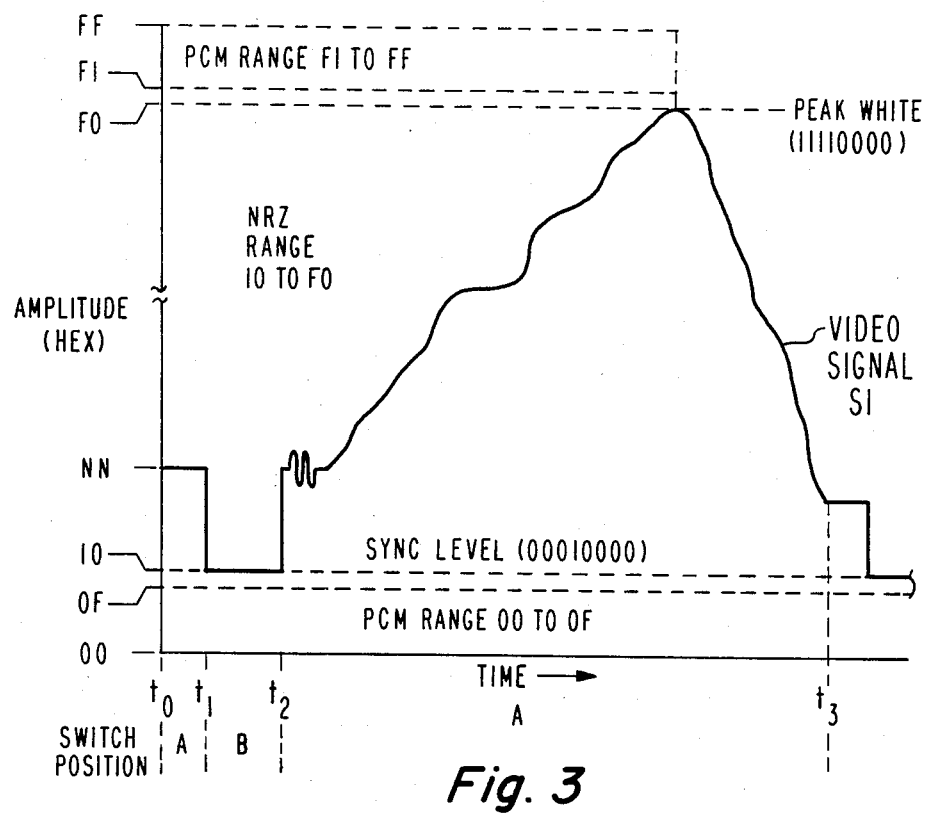
FIG. 3 is a diagram illustrating certain aspects of operation of the encoder of FIGS. 1 and 2.

FIG. 3 provides a graphical illustration of the foregoing encoding criteria. The NRZ encoded video signal S1 comprises eight bit words that are constrained to values lying in the range from "10" (decimal 16) to "F0" (decimal 240) (hexadecimal notation). Peak white has a binary value of 11110000 (decimal 240) and and synchronizing level (sync tip) has a value of 00010000 (decimal 16). The disallowed states of the signal comprise a lower range from 00 to 0F (00000000 to 00001111 corresponding to decimal 0 to decimal 15) and an upper range from F1 (11110001 or decimal 241) to FF (11111111 or decimal 255). During the line interval periods from T0 to T1 and from T2 to T3 the video signal is at a non-synchronizing level and is encoded and transmitted in NRZ form with the values from the central range 10 to F0. During the synchronizing level period (T1 to T2) a PCM signal derived from the color burst reference frequency signal component is formed from the upper and lower ranges of values and transmitted in PCM form.

The PCM code comprises blocks of words, a preferred sequence being 00-FF-FF-FF. This sequence, as will be explained has the desirable characteristic that it may readily be transformed either in the encoder or in the decoder to another sequence 01-FF-FF-FE by a one bit shift left. This latter sequence has the unique quality that when it is applied in PCM form to an NRZ detector the result will be a decoded sequence of 01-00-00-01. This number differs from the synchronizing level of the video signal S1 by a small amount and is nearly constant, the variation corresponding to only a one bit change in the least significant bit during each block of words.

As will be explained subsequently, the effect of NRZ decoding of PCM words to represent the synchronizing level condition of the video signal results in slight stretch of the sync tip amplitude and a peak ripple component of one LSB at the subcarrier frequency and an average synchronizing level ripple component of only 0.5 LSB. For all practical purposes this extremely small distortion of the video signal (which occurs only during the blanking interval) will have no visible effect when the video signal is ultimately displayed on a receiver or monitor.

Returning to FIG. 1, the encoded video signal S2 is applied to an optical emitter 14 which is coupled by a fiber optic cable 16 to an optical detector 18. The fiber optical cable transmission has the advantages previously noted. In certain applications (e.g., satellite transmission, ground-to-air or air-to-ground transmission) it may be desirable to employ a wide-band RF transmission system rather than a fiber optic cable. Typical data rate requirements for the transmission system for NTSC standard signals sampled at four times subcarrier frequency and with eight bit encoding correspond to about 115 Mega-bits per second.

The signal S2 produced at the output of detector 18 is applied to a dual format decoder 20 which, in turn, produces a decoded video output signal (in analog or bit-parallel digital form) and supplies the decoded signal to studio equipment unit 22 or some other suitable utilization device. The video signal S2 is decoded in decoder 20 by sensing transitions and non-transitions of signal S2 as if the signal were only encoded in NRZ form. As previously noted, the signal S2 is actually encoded with two completely different code formats, PCM and NRZ. In the decoder all NRZ words are interpreted as being representative of video information and are disregarded insofar as clock recovery is concerned. All PCM words are used for the dual purposes of providing the timing information necessary to decode the NRZ words and providing a representation of a specific level of the video signal during the sync tip portion of the blanking interval in a form recoverable by NRZ decoding of the PCM signal. This feature of the invention provides a substantial benefit in the decoder since it is not necessary to separate the PCM data from the NRZ data in processing the video output signal.

Figure 2:
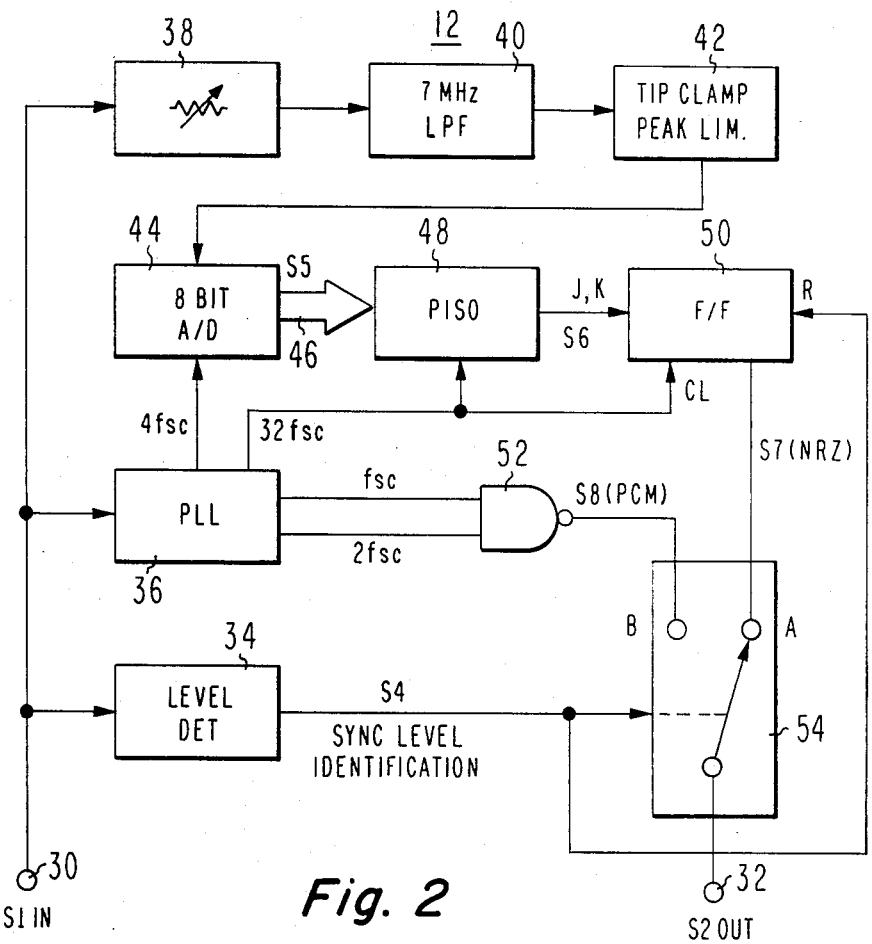
FIG. 2 is a block diagram of an encoder suitable for use in the system of FIG. 1 and embodying the invention.

The foregoing features and other features of the invention may be more fully appreciated by considering the following specific examples of implementation of the digital video transmission system of FIG. 1. Consider first the encoder 12 of FIG. 1 as exemplified by the detailed block diagram of FIG. 2. The encoder comprises an input terminal 30 for receiving the video input signal (analog form) and an output terminal 32 for providing the encoded output signal S2. Terminal 30 is coupled to a level detector 34, to a multiplying phase lock loop (PLL) 36 and to a level control unit 38. For purposes of illustration it will be assumed that signal S1 is a NTSC composite color video signal.

Detector 34 is responsive to signal S1 for providing a synchronizing level identification signal S4. PLL 36 responds to the color burst component of signal S1 for providing timing signals at frequencies Fsc, 2Fsc, 4Fsc and 32Fsc (Fsc is the color subcarrier reference frequency). The output of unit 38 is coupled via a 7 MHz low pass filter 40 and a tip clamp and peak limiter unit 42 to the input of an 8 bit analog to digital converter 44 which receives a 4Fsc clock signal from PLL 36.

Filter 40 is a conventional anti-aliasing filter which prevents components of signal S1 which are higher than half the sampling frequency from reaching the input of A/D converter 44. Unit 38 in conjunction with unit 42 scale the signal S1 to conform to the limits shown in FIG. 3 (i.e., sync tip is set to a level corresponding to 00010000 of the converter output signal, peak white corresponds to 11110000). Peak limiting is included in unit 42 to clip excursions of the video signal which would exceed the peak white level of 11110000 (F0 in hexadecimal notation).

The output of A/D converter 44 comprises 8 bit digital words S5 which are applied via a data bus 46 to a parallel-in serial-out (PISO) converter 48 which receives a 32Fsc clock signal from PLL 36. The serial digital output signal produced by PISO 48 is applied to the J and K inputs of a JK flip flop (F/F) 50 which receives a clock signal (CL) of 32Fsc from PLL 36 and a reset signal (F) from detector 34 and provides a non-return to zero (NRZ) output signal S7. In the NRZ format first binary states (logic ones in this example) are represented by transitions of the signal and second logic states (logic zeros in this example) are represented by non-transitions of the signal. In addition to being NRZ encoded, the signal S2 is also "run length limited" in that each word contains at least one binary "1" (no word contains all zeros). Run length limiting of an NRZ transmission is characterized by a substantially constant average level of the signal. The absence of DC component variations allows AC coupling and minimizes problems of DC drift in the transmission system. The signal is actually "doubly limited" in the sense that no NRZ word contains all "ones" either (see FIG. 3). The "all one limit" is not for the purpose of suppressing DC or average value variations, but rather is related to the formation of a PCM timing component as will be discussed subsequently.

Generation of the PCM component of signal S2 is provided by a gate 52 which receives the Fsc and 2Fsc clock signals from PLL 36 and produces an output signal S8 which is low for eight cycles and high for 24 cycles of the 32Fsc signal. This corresponds to a serial code sequence (in PCM format) of 00-FF-FF-FF (hexadecimal notation) which repeats every 32Fsc clock cycles to thereby form blocks of the 00-FF-FF-FF sequence. One block occurs during eac complete cycle of the subcarrier (32 clock cycles). Accordingly the four word sequence in each block uniquely identifies four subcarrier phases (0, 90, 180 and 270 degrees). This relationship conveys word synchronization information to the decoder. Bit synchronization is obtained by multiplying the recovered word clock by a factor of eight.

The serial synchronous digital output signal S2 is formed by means of switch 54 which selectively couples the NRZ and PCM encoded signals to output terminal 32 in response to the sync level identification signal S4. During non-sync level conditions of signal S1 switch 54 is placed in position "A" for coupling the NRZ encoded signal S7 to terminal 32. Conversely, during sync level conditions of signal S1, switch 54 is placed in position "B" for coupling the PCM encoded signal 58 to terminal 52.

Figure 4:
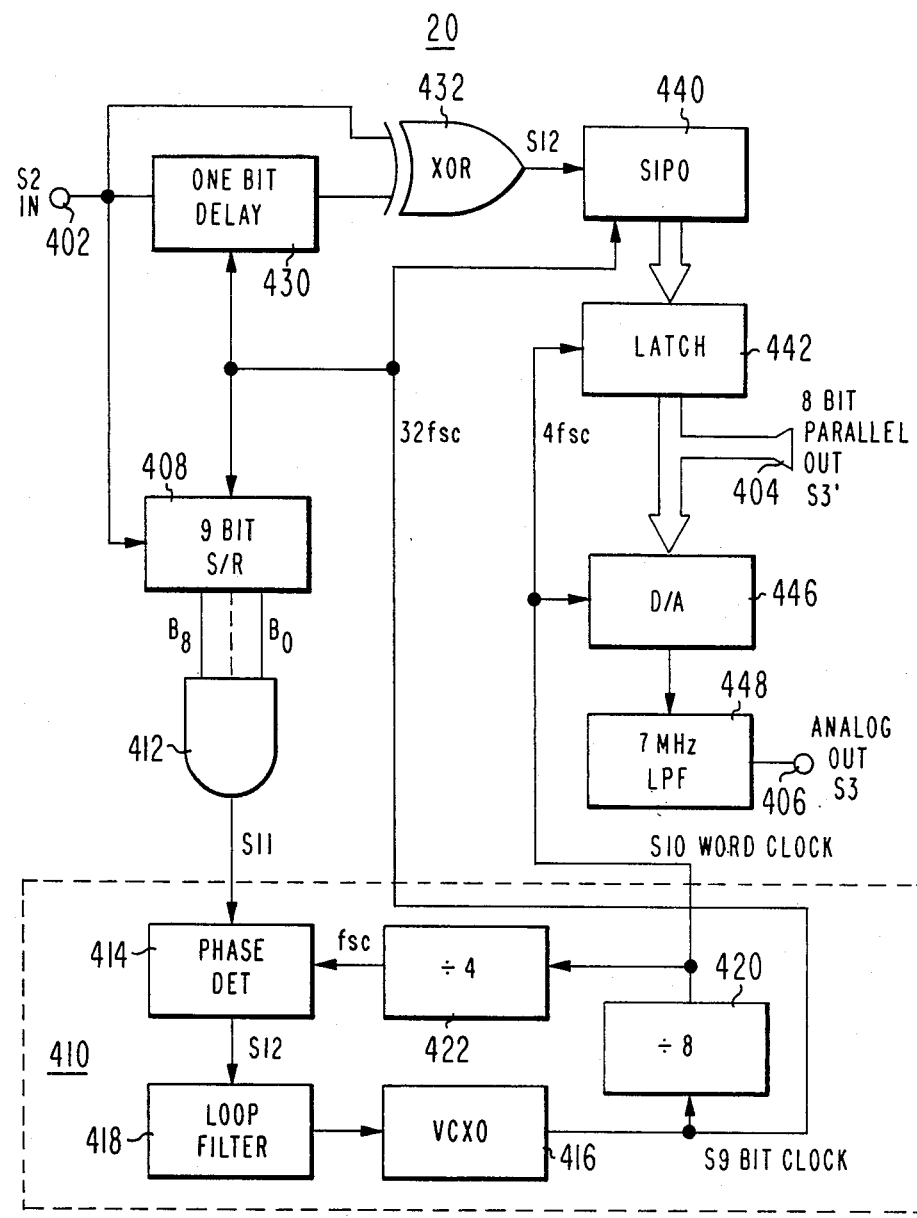
FIG. 4 is a block diagram of a decoder suitable for use in the system of FIG. 1 and embodying the invention.

The decoder 20 of FIG. 4 comprises an input terminal 402 for receiving the encoded signal S2, one eight bit parallel output port 404 for providing a decoded digital video output signal (S3') in parallel form and a further output terminal 406 for providing a decoded analog video output signal S3.

Recovery of a bit clock signal S9 (32Fsc) and a word clock signal S10 (4Fsc) for decoding signal S2 is provided by a 9 bit shift register 408 having a data input coupled to terminal 402 for receiving signal S2 and a clock input coupled via a feedback path from a multiplying PLL 410 for receiving the bit clock signal S9. Since the NRZ portion of signal S2 is run length limited as previously described, there will never be 9 successive high states in register 408 when NRZ data is present. Each block of the PCM data corresponds to one cycle of Fsc and comprises eight zeros followed by twenty-four ones (00-FF-FF-FF in Hex). Therefore the nine stages of register 408 will be high during a portion of each PCM word block. This condition identifies the subcarrier frequency and phase and is detected by AND gate 412 which is coupled to receive bits B0 through B8 (nine bits) of the register 408 and to supply a recovered subcarrier (Fsc) reference signal S11 to phase detector 414 of PLL 410. Bit B0 corresponds to the shift register input (unclocked).

PLL 410 includes a voltage controlled crystal oscillator (VCXO) 416 having a nominal center frequency of 32Fsc. VCXO 416 has an input coupled via a loop filter 418 to receive an error signal S12 produced by detector 414 and an output coupled via a cascade connection of a divide-by-eight counter 420 and a divide-by-four counter 422 to an input of phase detector 414. Detector 414 compares signal S11 with the output of counter 422 (Fsc) and varies the error signal S12 in a sense to establish phase lock. The output of counter 420 is therefore locked to the word clock rate (4Fsc) and VCXO 416 is locked to the bit clock rate (32Fsc) and will be in quadrature with the signaling intervals (bits) of the PCM code thereby assuring proper sampling of signal S2 by register 408.

NRZ and PCM decoding of signal S2 is provided by an exclusive-OR gate 432 having a first input connected to termnal 402 and a second input coupled to terminal 402 via a one bit delay shift register 430 clocked by the 32Fsc bit clock signal S9. The output of gate 432 will be low if any two successive bits of signal S2 are identical (both high or both low) and will be high if any two successive bits are different (one high, one low). Gate 432 in combination with register 430 thus form a transition detector which decodes the NRZ code produced by flip flop 50 in encoder 12 to provide a decoded bit-serial PCM video output signal S12. Signal S12 is applied to a serial-in parallel-out register (SIPO) 440 which samples signal S12 at the bit rate (32Fsc). The sampled data is supplied via an eight bit bus to an eight bit latch 442 which is clocked at the word rate (4Fsc) in response to signal S10 and supplies eight bit parallel words to output port 404 and to the input of a digital to analog (D/A) converter 446 which is clocked at the word clock rate (4Fsc). The analog video output signal S3 is obtained by coupling the output of converter 446 to termnal 406 via a 7 MHz low pass filter (LPF) 448.

Figure 5:
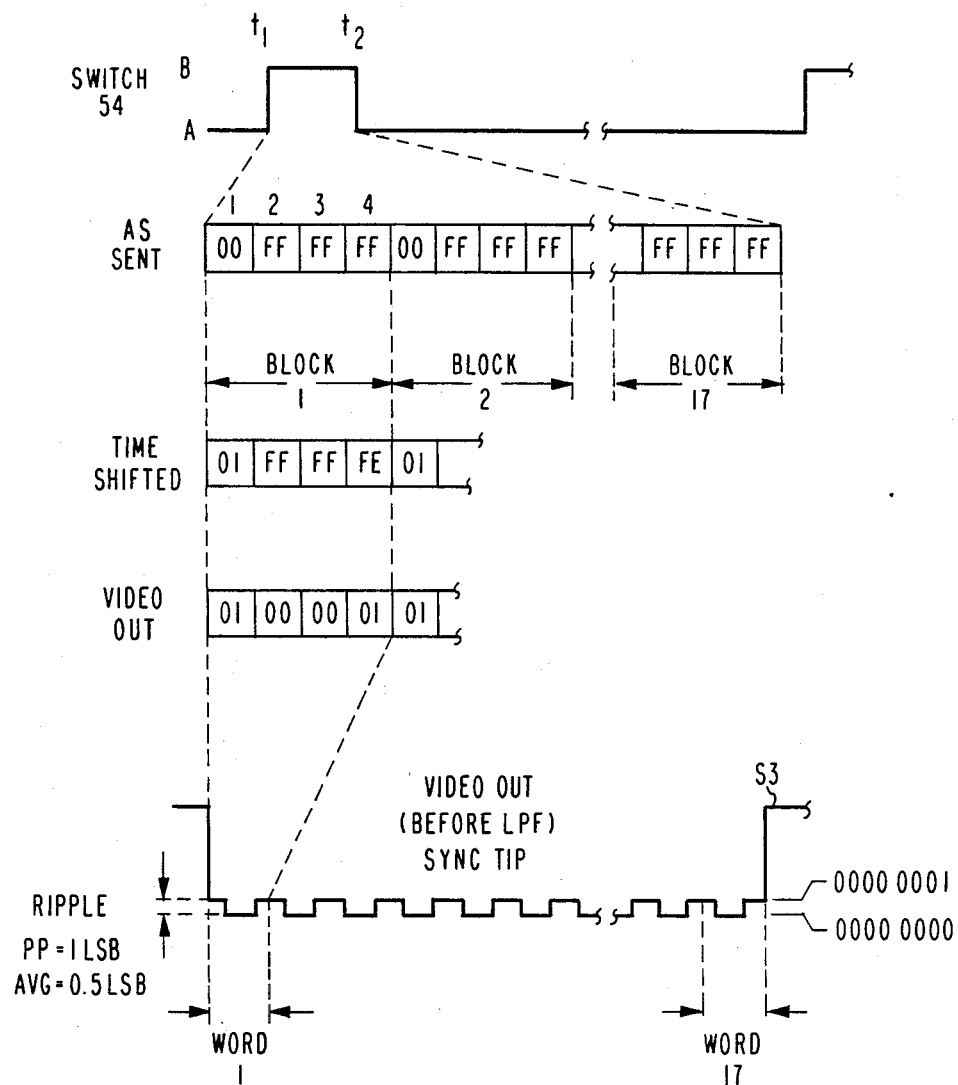
FIG. 5 is a diagram illustrating certain aspects of operation of the decoder of FIG. 4.

FIG. 5 illustrates the operation of decoder 20 during sync level conditions of signal S1 when switch 54 is in position "B" in the encoder. During the interval of this condition (T1-T2) signal S2 is encoded in PCM form as previously described. As illustrated, the code sent comprises 17 blocks of four words each, the sequence being 00-FF-FF-FF (Hexadecimal notation). This code may be readily transformed to 01-FF-FF-FE in either the encoder or the decoder by a one bit shift left. A clock delay of 9 nanoseconds in the decoder will provide the desired time shift and may be obtained by appropriately "tuning" VCXO 416 in PLL 410. The PCM block code sequence 01-FF-FF-FE will be decoded by gate 432 as the sequence 01-00-00-01 since gate 432 responds only to state differences between adjacent bits and does not interpret bits in terms of DC levels.

FIGS. 6a, 6b and 6c provide a binary representation of the transmitted (6a), time shifted (6b) and NRZ decoded (6c) PCM blocks. This form of representation clearly identifies the location of transitions in each PCM block. In block 6a transitions occur between the last bit of word 1 and the first bit of word 2 and between the last bit of word 4 and the first bit of word 1 of the next block. In FIG. 6b the transitions all occur between the last two bits of words 1 and 4. The NRZ decoder, it will be recalled, interprets adjacent bits as a zero if they are identical and as a one if they differ. Accordingly, decoding of the PCM signal in the NRZ detector results in output words which equal either zero (words 2 and 3) or one (words 1 and 4) as shown in FIG. 6c.

The ultimate effect of PCM decoding by the NRZ detector is shown by waveform S3 of FIG. 5 where it is seen that the recovered video output signal (prior to low pass filtering) has a ripple component of one LSB and is at a level which alternates between 00 and 01 (Hex). After filtering the ripple averages to 0.5 LSB and is not perceptible when applied to a monitor or receiver since it is blacker-than-black and not in the active picture (scan) area. The sync tip is "stretched" by slightly less than six percent of its original amplitude but this also will have no effect on displayed images.

It will be appreciated that various parameters (e.g., clock rates, word lengths, block lengths, etc.) of the examples of the invention given herein may be altered to suit specific applications. The specific PCM code described will, of course, vary with the choice of block and word lengths. The most desirable PCM code is one selected such that when it is NRZ decoded the result will be a minimum ripple representation of a predetermined video signal level.

What is claimed is:

1. An encoder for providing serial synchronous digital transmission of a video input signal, comprising:
    input means responsive to said video input signal for providing a color subcarrier reference signal, a synchronizing level identification signal and a run length limited NRZ encoded video output signal;
    circuit means responsive to said subcarrier reference signal for providing a PCM encoded signal representative thereof;
    an output node;
    second circuit means responsive to said synchronizing level identification signal for selectively coupling said NRZ and PCM encoded signals to said output node to provide a resultant digital output signal; and wherein:
    said PCM encoded signal comprises sequential blocks of words, each word having a predetermined binary value not contained in any word of said NRZ encoded signal.

2. An encoder as recited in claim 1 wherein said NRZ encoded signal comprises sequential words, each word having a binary value selected from a given range of values and excluding a lower range of values and excluding an upper range of values.

3. An encoder as recited in claim 1 wherein each said block of words comprising a given number of words of a first binary value and a different number of words of a second binary value.

4. An encoder as recited in claim 3 wherein said given number is one and wherein said different number is three.

5. An encoder as recited in claim 3 wherein one word of each block has a binary value lower than the binary value of any of said NRZ words and another word of each block has a binary value greater than the binary value of any of said NRZ words.

6. An encoder as recited in claim 5 wherein the binary value of said one word comprises all zero's and wherein the binary value of said another word comprises all ones.

7. An enoder as recited in claim 1 wherein said input means includes a source for providing a second subcarrier reference signal at a multiple of the frequency of the first named subcarrier reference signal and said circuit means comprises means for logically combining said first and second subcarrier reference signals to provide said PCM encoded signal.

8. An encoder as recited in claim 7 wherein said input means comprises a source responsive to said video input signal for providing a parallel digital manifestation thereof, wherein each digital word has a minimum binary value greater than all zeros and a maximum binary value less than all ones, said source being coupled to parallel-in serial-out conversion means for providing a serial digital output signal, said conversion means being coupled to further conversion means for providing said NRZ encoded video output signal.

9. An encoder as recited in claim 8 wherein said second circuit means is responsive to a first condition of said synchronizing level identification signal for coupling said NRZ encoded signal to said output node and responsive to a second condition of said synchronizing level identification signal for coupling said PCM encoded signal to said output node.

10. A decoder, comprising:
    input means for receiving a bit-serial digital input signal manifestation of a type comprising sequential binary words representative of an encoded video signal, each word representative of a synchronizing level condition of said video signal being encoded in PCM form, each word representative of a non-blanking level condition of said video signal being encoded in run length limited NRZ form, each PCM encoded word having a binary value different from that of every NRZ encoded word;
    first means responsive to the PCM encoded portion of said signal manifestation for providing first and second clock signals at the bit rate and word rate, respectively, of said digital signal manifestation; and
    second means responsive to said clock signals for decoding both the PCM portion and the NRZ portion of said signal manifestation to provide a digital video output signal in which each word is in bit-parallel form.

11. A decoder as recited in claim 10 wherein said first means comprises:
    shift register means having an input coupled to receive said digital signal manifestation;
    phase lock loop means having input means coupled to output means of said shift register means and having output means for providing said first and second clock signal; and
    feedback means for applying said first clock signal to a clock input terminal of said shift register means.

12. A decoder as recited in claim 11 wherein said second means comprises an NRZ detector having a first input connected to said input means for continuously receiving said digital signal manifestation, having a second input coupled to said phase lock loop means for receiving said first clock signal and having an output for providing a bit-serial digital output signal; and
    converter means responsive to said first and second clock signals and to said bit-serial digital output signal for providing said bit-parallel digital video output signal.

13. A system for providing digital transmission of a video signal, comprising:
 encoder means responsive to said video signal for providing a bit-serial digital output signal comprising sequential binary words, each word representative of a synchronizing level condition of said video signal being encoded in PCM form in which a first value of each bit corresponds to a first level of said output signal and a second value of each bit corresponds to a second level of said output signal, each word representative of a non-synchronizing level condition of said video signal being encoded in run length limited NRZ form in which one value of each bit corresponds to a transition of said output signal and in which another value of each bit corresponds to a non-transition of said video output signal, each PCM encoded word having a binary value different from any NRZ encoded word;
 transmission means; and
 decoder means adapted to be coupled to said encoder means via said transmission means and comprising first and second detector means, the first detector means being responsive to the PCM encoded portion of said digital output signal for providing a bit clock signal and a word clock signal, the second detector means being responsive to said clock signals for detecting transitions and non-transitions of said digital output signal to provide a decoded digital video signal in bit-parallel form.

14. A system as recited in claim 13 wherein each NRZ encoded word having a binary value selected from a given range of values and each PCM encoded word has a binary value selected from first and second other ranges of values, no binary value being common to any of said ranges of values.

15. A system as recited in claim 13 wherein the PCM encoded portion of said digital video signal comprises sequential blocks of said PCM encoded words, each block comprising a first word of a first binary value and at least two further words each of a second binary value.

16. A system as recited in claim 13 wherein said video input signal is of analog form and wherein said encoder means comprises scaling means for forming an analog video output signal having predetermined maximum and minimum levels and converter means responsive to the scaled analog video output signal for providing a digital video signal manifestation in which each word thereof has a minimum value greater than all zeros and a maximum value less than all ones.

17. A system as recited in claim 13 wherein said encoder includes means for forming the PCM encoded portion of said digital output signal in response to a color subcarrier reference frequency signal component of said video signal.

18. A system as recited in claim 13 wherein said encoder means includes means responsive to said video signal for providing a synchronizing level identification signal and circuit means responsive to said synchronizing level identification signal for selectively coupling said PCM encoded portions and said NRZ encoded portions of said video signal to an output means of said encoder means.

* * * * *